Patented Oct. 6, 1936

2,056,260

UNITED STATES PATENT OFFICE 2,056,260

MANUFACTURE OF O-NITRO-ANISOLE

Miles A. Dahlen and Houghton G. Clapp, Wilmington, Del., and Sloan B. Jordan, Vineland, N. J., assignors to E. I. du Pont de Nemours & Company, Wilmington, Del., a corporation of Delaware No Drawing. Application October 26, 1935, Serial No. 46,868

4 Claims. (Cl. 260—143)

This invention relates to a method for preparing o-nitro-anisole. o-nitro-anisole has been known and widely used for a number of years. It has been prepared by reacting suitable mixtures of o-nitro-chlor-benzene, methyl alcohol, and a caustic alkali. This invention relates to, and constitutes an improvement on, that process.

In the prior art method of manufacturing o-nitro-anisole by the methoxylation of o-nitro-chlor-benzene in the presence of alkali, all the alkali was added at the start of the reaction, or was added in portions during the process. In the latter cases the prior art processes involved the addition of these portions of alkali without regard for the concentration of alkali produced by the addition. In the old process, wherein an empirically determined quantity of alkali was added at the start, or in portions during the reaction, undesirable side reactions and excessive temperatures impaired the quality of the product. Our invention overcomes the imperfections of the earlier process.

It is an object of our invention to improve the process of manufacturing o-nitro-anisole from o-nitro-chlor benzene by reaction with methyl alcohol in the presence of alkali. Another object of our invention is to eliminate from the process the deleterious side reactions which have been characteristic of the prior art. A further object of the invention is to prepare a superior grade of o-nitro-anisole. Another object of the invention is to obtain a product of high freezing point, low chlorine content, good color, and high yield without special processes of purification.

The objects of this invention are accomplished, generally speaking, by reacting o-nitro-chlor-benzene with methyl alcohol in the presence of caustic alkali, the concentration of the caustic alkali at the start being less than that at which deleterious side reactions or temperatures are evolved, and the addition to the reaction mass of caustic alkali being at substantially the rate of consumption.

The reaction mass may be considered a three component system, containing o-nitro-chlor-benzene, methyl alcohol, and alkali. We have discovered that, at any given reaction temperature, with a given ratio of o-nitro-chlor-benzene to methyl alcohol, there is an upper limit of alkali concentration which must not be exceeded if undesirable side reactions are to be avoided. However, with the factors of temperature and o-nitro-chlor-benzene-methyl alcohol ratio being held constant, the velocity of the reaction is markedly affected by the alkali concentration, and to attain an optimum rate of reaction the alkali concentration should be held not too far below that at which excessive side reactions appear.

As the o-nitro-chlor-benzene is converted to o-nitro-anisole, the ratio of o-nitro-chlor-benzene and methyl alcohol falls, and as the concentration of o-nitro-chlor-benzene decreases the reaction velocity decreases also, the other factors not being varied. We have further discovered that the maximum reaction rate can be attained at this stage of the process by an increased alkali concentration. For instance, if the ratio of o-nitro-chlor-benzene to methyl alcohol is 1:3.1, the temperature of the reaction maintained throughout at 67° C., the optimum alkali concentration is about .77 N. When the reaction is 40% complete, the said ratio has dropped to about 1:5.05 and the alkali concentration may be raised to .97 N. When the reaction has been 70% completed, the ratio of o-nitro-chlor-benzene to methyl alcohol is 1:10.1 and an alkali concentration of 1.12 N is permissible.

In carrying out the reaction, the reaction vessel is charged with o-nitro-chlor-benzene, methyl alcohol, and sufficient caustic alkali to give the desired concentration; the reaction mass is agitated and heated to a preferred temperature, and a strong solution of caustic alkali is added at a rate that produces the most favorable concentration at each stage of the process. When the reaction is complete, the product may be isolated by any standard procedure. The excess alkali may, for example, be nearly neutralized with dilute sulfuric acid, the excess alcohol removed by distillation, and the product washed with water to remove the salt and any water soluble impurities which may be contained. The product separates as an oily layer and is of exceptional purity.

The material of which the reaction vessel is made has a distinct effect on the process, some materials inducing undesirable side reactions. Glass or other siliceous materials, such as silicate-enameled metal, have no appreciable effect on the reaction. Nickel is also a valuable material, ranking but little below the siliceous materials in this respect. Copper and alloys such as bronze, Monel metal, and the so-called "stainless" steels are of a lower order, but exercise only a small adverse effect. Iron and steel both affect the reaction deleteriously, apparently by catalyzing the reduction of the nitro body; when the reaction is carried out in equipment of that type under standard conditions, the product is highly colored, high in chlorine content, and poor in quality. If useful products are to be obtained, much milder reaction conditions must be used in such vessels.

In the following examples, which illustrate but do not limit the invention, the alkali concentration is expressed in terms of normality, which means the concentration of alkali in equivalent units per liter of reaction mass at the reaction temperature. Normality may be evaluated by this equation:

$$N = \frac{1000W}{VM}$$

where: N is the normality,
W is the weight of alkali in any volume V of solution at reaction temperature, and
M is the weight of one equivalent of alkali. For bases such as sodium or potassium hydroxide this is the molecular weight.

All quantities are parts by weight, and the methyl alcohol strengths are given as percent by weight.

Example I 916 parts of 95% methyl alcohol, 280 parts of o-nitro-chlor-benzene and 47.5 parts of 95% caustic soda were added to a copper reaction vessel with agitation, the temperature was brought to 67°, and the alkali concentration was maintained at 0.77 N for six hours by the slow addition of 50% aqueous sodium hydroxide solution, the alkali concentration being determined from time to time by removing samples of the reaction mass. The concentration of alkali was raised to and maintained at .97 N for six hours by the slow addition of the caustic solution, and was finally raised to and kept at 1.12 N until material of the desired purity was obtained. The material obtained at the end of 36 hours melted at 9.2–9.4° C.; that obtained after 38 hours at 9.5–9.7°; that obtained after 48 hours at 10.3° C. The product was isolated by the method described in Example II. The yield was 95% of the theoretical.

Example II 104 parts of 90% methyl alcohol, 24.2 parts of o-nitro-chlor-benzene, and 4.2 parts of 95% caustic soda were mingled in a copper vessel with agitation, the temperature was raised to and for six hours maintained at 67° C., and a stream of sodium hydroxide was added at a rate sufficient to maintain the concentration of the sodium hydroxide at 0.75 normal. The alkali concentration was determined each half hour by testing samples removed from the reaction mass. Sufficient caustic solution was added to raise the normality to 0.95, and that concentration of caustic was maintained for another six hours. The concentration of caustic was increased to 1.10 and maintained for 28 hours by the slow addition of the caustic solution. At the end of this forty hour period the reaction was practically complete, the reaction mass was partially neutralized with dilute sulfuric acid, the excess methyl alcohol was removed by distillation, and the oil was washed with water and separated. The product was light in color, had a freezing point of about 8.5° C., a chlorine content of about 0.3%, and was present in a yield of about 85% of the theoretical.

Example III 153 parts of 95% methyl alcohol, 38.2 parts of o-nitro-chlor-benzene, and 14.6 parts of 45% sodium hydroxide solution were mingled in a copper vessel with agitation, the temperature was raised and held at 67°, 45% caustic soda solution was added from time to time as required to keep the concentration of caustic at 0.75 N, after six hours the concentration of caustic was raised to and maintained for six hours at 0.95 normal. It was further raised to and held at 1.1 N until the reaction was complete. The product was isolated in a manner similar to those hereinbefore described.

Example IV 96 parts of 98.5% methyl alcohol and 9.2 parts of 45% caustic soda solution were heated for 12 hours at 65° C. in a copper reaction vessel, 24.2 parts of o-nitro-chlor-benzene were added, the temperature was raised to 67°, the normality of the caustic was established and maintained at 0.75 N for six hours. The concentration of caustic was raised to and maintained at 0.95 for an additional six hours, and was raised to and maintained at 1.1 N until the reaction was complete. The product was isolated by cooling, washing the oil with water, and separating it out. The freezing point of this oil was about 10° C. The remainder of the product was isolated as described in Example II.

Example V 160 parts of 98.5% methyl alcohol, 40 parts of o-nitro-chlor-benzene, and 15 parts of 45% caustic soda solution were placed in a glass reaction vessel, the temperature was brought to and held at about 67° throughout the reaction. The concentration of caustic was brought to 0.75 N and maintained there for six hours, was raised to 0.95 N and held there for an additional six hours, and was raised to 1.10 N and held for 26 hours. The product was isolated, and found to be of excellent quality.

Example VI 280 parts of 98.5% methyl alcohol, 70.7 parts of o-nitro-chlor-benzene, and 33.5 grams of 45% caustic soda solution were added to a glass reaction vessel with agitation, and the temperature was raised to 66.8–67.1° C. The normality of caustic was held at 0.77–0.81 N for six hours, was raised to 0.99–1.05 N for six hours, and to 1.22 N for three hours. No further caustic addition was made for nine hours, and the alkali concentration was allowed to fall to 1.09. The normality was raised to 1.21 and held there until the reaction was practically complete. The total reaction required 40 hours, and a product was obtained, in excellent yield, which was light in color, froze at about 9.3° C., and contained about 0.2% chlorine.

Many modifications may be made in the process without departing from the spirit of the invention: Any strong base, for instance potassium hydroxide, may replace wholly or in part the sodium hydroxide; the concentration of the caustic solution used in the process may be varied within wide limits; the amount of methyl alcohol used may be increased without deleteriously affecting the process; the initial concentration of the o-nitro-chlor-benzene may be varied but if raised the normality of the alkali, the temperature, or both should be changed; the normality of the caustic present in the reaction may be varied without affecting the product, provided the other factors are changed to correspond; the temperature at which the reaction is carried out at the optimum may be varied, provided the other factors are changed to correspond; any method of isolating the finished product may be employed; any convenient method of controlling the normality of the caustic may be used without departing from the invention; the concentration of the methyl alcohol may be varied between about 85–100%; the methyl alcohol employed may be new, may be recovered from the same process, or the two may be mixed.

This process gives a satisfactory, economical, and safe method for the preparation of the product. It is operated with the greatest economy of materials consistent with high quality of the product, and is accomplished in less time than is required in older processes. The product is of better quality than any that has previously been produced by any of the earlier processes; is of lighter color, has a higher freezing point (indicating the absence of impurities caused by side reactions), and needs no purification other than washing with water to remove the water soluble products present or formed during the reaction.

As many apparently widely different embodiments of this invention may be made without departing from the spirit and scope thereof, it is to be understood that we do not limit ourselves to the specific embodiments thereof except as defined by the appended claims.

We claim:

1. The process which comprises heating at 67° C. in a copper reaction vessel 916 parts 95% methyl alcohol, 280 parts ortho-nitro-chlor-benzene, 47.5 parts 95% sodium hydroxide, maintaining the alkali concentration at .77 N for six hours by the occasional addition of 50% sodium hydroxide aqueous solution, raising the alkali concentration to and maintaining it at .97 N for six hours by the occasional addition of 50% sodium hydroxide aqueous solution, raising the alkali concentration to and maintaining it at 1.12 N by the occasional addition of 50% sodium hydroxide aqueous solution until the reaction is completed, neutralizing the mass with sulfuric acid, distilling off the excess alcohol, and washing and isolating the o-nitro-anisole.

2. The process which comprises heating at about 67° C. in a siliceous reaction vessel a mixture of methyl alcohol, o-nitro-chlor-benzene and 95% sodium hydroxide, maintaining the alkali concentration at about .77 N by the occasional addition of 50% sodium hydroxide aqueous solution until an increase in the concentration produces no deleterious side reactions, raising the alkali concentration to and maintaining it at .97 N by the occasional addition of 50% sodium hydroxide aqueous solution until the concentration of alkali can be raised without inducing deleterious side reactions, raising the alkali concentration to and maintaining it at 1.12 N until the reaction is completed, neutralizing the mass and isolating the o-nitro-anisole.

3. The method which comprises heating methyl alcohol, o-nitro-chlor-benzene and sodium hydroxide, the concentration of alkali at the start of the reaction being beneath that at which undesirable side reactions and excessive temperatures are evolved, and in which alkali is added during the course of the reaction at substantially the rate at which it is used.

4. In the method of producing o-nitro-anisole by the methoxylation of o-nitro-chlor-benzene the steps which comprise commencing the reaction with a concentration of caustic alkali below that at which undesirable side reactions occur, and throughout the process increasing the concentration of caustic alkali to compensate for the change in concentrations of the reacting ingredients due to the formation of the final product.

MILES A. DAHLEN.
HOUGHTON G. CLAPP.
SLOAN B. JORDAN.